R. G. POPP & A. L. DE HOREVITZ.
FARE REGISTER FOR VEHICLES.
APPLICATION FILED FEB. 28, 1906.

912,728.

Patented Feb. 16, 1909.
8 SHEETS—SHEET 2.

Fig. 9.

UNITED STATES PATENT OFFICE.

RICHARD GEORGES POPP AND ALDO LEVIS DE HOREVITZ, OF PARIS, FRANCE.

FARE-REGISTER FOR VEHICLES.

No. 912,728.   Specification of Letters Patent.   Patented Feb. 16, 1909.

Application filed February 28, 1906. Serial No. 303,493.

*To all whom it may concern:*

Be it known that we, RICHARD GEORGES POPP, engineer, citizen of the French Republic, and ALDO LEVIS DE HOREVITZ, engineer, subject of the King of Italy, both residing at Paris, France, have invented certain new and useful Improvements in Fare-Registers for Vehicles, of which the following is a specification.

This invention relates to a combined indicating and registering apparatus, and has for its object to provide an apparatus of such class in a manner as hereinafter set forth, particularly adapted for use in connection with cabs and like vehicles, said apparatus being adapted to indicate to the occupants of the vehicle the sum he has to pay and furthermore to register both the total amount received by the driver for the hiring of the vehicle and the total distance traversed by the vehicle during the day.

The invention further aims to provide an apparatus of such class with means in a manner as hereinafter set forth which is only accessible to the vehicle owner and which constitutes a check upon the driver and further registers the total number of times the vehicle is hired and the total amount of fares received from the driver, whether such fares be regular or extra, said means further registering the total distance traversed by the vehicle during the day.

The apparatus is adapted for use in connection with all tariffs, either time or distance. When the following tariff which is used in Paris is adopted, according to which tariff a certain initial sum, for example 75 centimes is to be paid on hiring the vehicle, for this sum the hirer has the right to ride either the distance of 1200 meters or to occupy the carriage for 9 minutes, whether the carriage be standing still or moving at a slow pace; for each additional distance of 400 meters or additional time of 3 minutes a smaller sum amounting say to 10 centimes each has to be paid.

An apparatus in accordance with this invention operates, as before stated, in accordance to a time tariff or to a distance tariff, the registering mechanism being connected to a gear for transmitting the motion of the vehicle wheels and also to a clock-work so that, according as the speed of the vehicle is greater or less than 10 kilometers, either the vehicle wheel gear or the clock-work is brought into action to operate the registering mechanism.

Briefly described, an indicating and registering apparatus in accordance with this invention comprises a mechanism for indicating the sums to be paid by the hirer; a mechanism for indicating the sums to be paid by the hirer for extra distance or time; an integrating device for registering the number of hirers in the day; an integrating device indicating the total amount paid by the hirers during the day; an integrating device giving the total amount of the extra charges received during the day; an integrating device giving the total distance traversed in the day and a mechanism for operating the counter mechanism when the registering device is operated according to a time tariff and the speed of the vehicle does not exceed a predetermined rate per hour.

The invention further aims to provide an apparatus of the character referred to which shall be comparatively simple in its construction, strong, durable, efficient in its use, accurate in its recording, readily set up in connection with the vehicle and comparatively inexpensive to manufacture.

With the foregoing and other objects in view, the invention consists of the novel construction, combination and arrangement of parts hereinafter more specifically described and illustrated in the accompanying drawings wherein is shown the preferred embodiment of the invention, but it is to be understood that changes, variations and modifications can be resorted to which come within the scope of the claims hereunto appended.

In the drawings: Fig. 6, and Figs. 8 and 9 are respectively vertical sections on the lines B—B and C—C, Fig. 2.

Referring to the drawings in detail, 1 and 1ˣ denote a pair of side plates connected together by stays or tie rods 2, the said plates constituting a frame and supporting the working parts of the apparatus.

Figure 2:
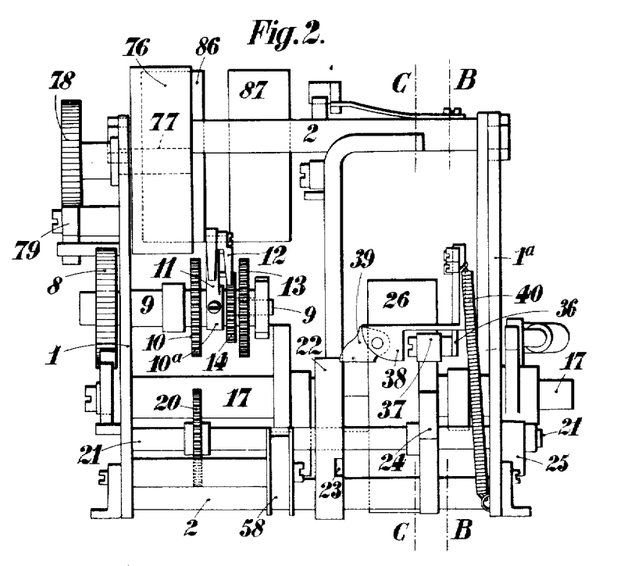
Fig. 2 is a plan of the indicating mechanism.
Figure 5:
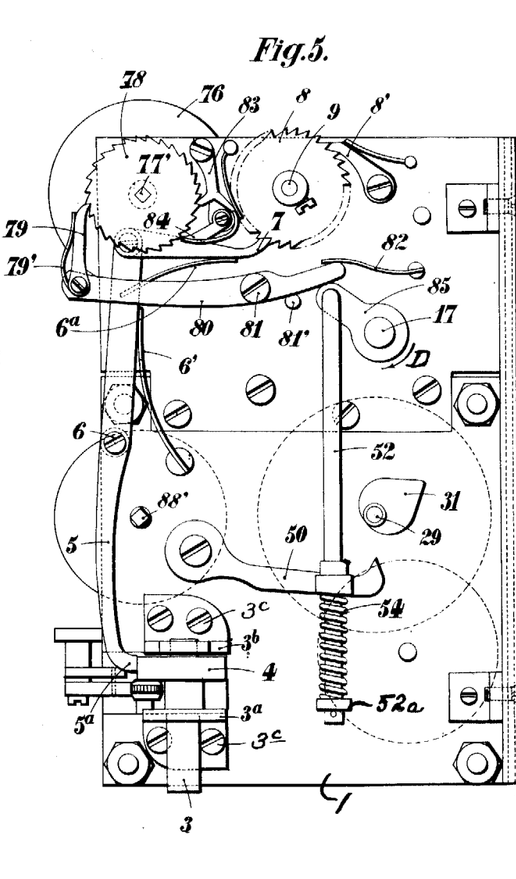

The registering and integrating drums are actuated through the medium of a motion transmitting mechanism operated from a moving part of the vehicle and by reference to Fig. 5 said motion transmission mechanism is clearly shown the same consisting of a rotatable spindle 3 connected in any suitable manner to and driven by a moving part of the vehicle, preferably the wheels. The spindle 3 is supported in the brackets 3ª, 3ᵇ secured by the hold-fast devices 3ᶜ to the lower portion of the outer face of the plate 1. The spindle 3 carries a cam 4 which engages with the nose 5ª of an oscillatory lever 5. The engaging of the cam 4 with the nose 5ª of the lever 5 oscillates the latter upon its pivot 6 which projects from the outer face of the plate 1. The lever 6 carries at one end a pawl 7 retained by a spring 6ª in engagement with a ratchet wheel 8 which is keyed on a spindle 9 journaled in the plate 1. A detent 8' carried by the side plate 1 engages the wheel 8 to prevent the backward rotation of the latter. The spindle 9 has also fixed thereto a toothed wheel 10 (Fig. 2) and a collar 10ª which has formed integral therewith an arm 11. Pivoted to the arm 11 is a pawl 12 adapted to engage a ratchet wheel 14 formed integral with a gear wheel 13 which is loosely mounted on the spindle 9. From the foregoing arrangement of parts, it is evident that when the vehicle is traveling, the spindle 3 will be rotated and as the cam 4 is carried thereby and engages with the nose 5ª of the lever, the lever 5ª will be oscillated to and fro upon its pivot 6, whereby the pawl 6 which is retained in engagement by the spring 6ª with the ratchet wheel 8, will impart to said wheel 8 intermittent motions of partial rotation, and as the gear wheel 10 is fast on the spindle 9 and which is adapted to mesh with the gear wheel 15 (Fig. 9) motion is transmitted to the indicating and integrating drums through a gearing which will be hereinafter referred to.

The gear wheel 13 is rotated by a clock-work to impart motion to the working parts of the counter-mechanism and which is adjusted to operate at the required speed. When the vehicle is traveling, the ratchet wheel 8 imparts to the spindle 9 a more rapid rotation than that which the gear wheel 13 would impart to it. The spindle 9 and toothed wheel 10 are rotated by the vehicle wheels through the medium of the ratchet wheel 8 and as the pawl 12 carried by the arm 11 which is formed integral with the collar 10ª, the latter being fixed to the spindle 9, revolves more quickly than the ratchet wheel 14 which is rotated by the clock-work, the pawl 12 rides over the teeth of the ratchet wheel 14, the latter, as before stated, being formed integral with the gear wheel 13. If the wheel is running too slowly, or is standing still, the gear wheel 13 driven by the clock-work, rotates and the pawl 12 revolves the shaft 9 which carries the toothed wheel 10 therewith and which will cause the operation of the registering device through the medium of the driving of the spindle 9 by the clock-work. It will thus be seen that the registering device is always operated according to either the speed or time on which the tariff is based.

The gear wheel 15 is adapted to be brought into and moved out of mesh with an element forming a part of the gearing for operating the indicating and integrating drums, the said element being illustrated as a gear wheel and indicated by the reference character 20. By such an arrangement the indicating and integrating drums are not operated unless the gear wheel 15 meshes with the gear wheel 20. To provide for the moving of the gear wheel 15 into and out of engagement with the gear wheel 20, the said gear wheel 15 is carried by an arm 18 loosely mounted on the spindle 9 and shifted by a cam 16 (Fig. 9) carried on a flag shaft 17. To the latter is attached the flag or "engaged" notice. The normal position of the gear 15 is that of meshing with the gear wheel 20. A spring 19 acts as a medium for retaining the gear wheel 15 in its normal position, that is to say meshing with the gear wheel 20. The cam 16 acts as a means to shift the gear wheel 15 from normal position when said shaft 17 is rotated which carries the cam 16 therewith. The arm 18 which carries the gear wheel 15 is provided with an extension 18ª which is positioned in the path of the cam 16, as clearly shown in Fig. 9.

Figure 4:
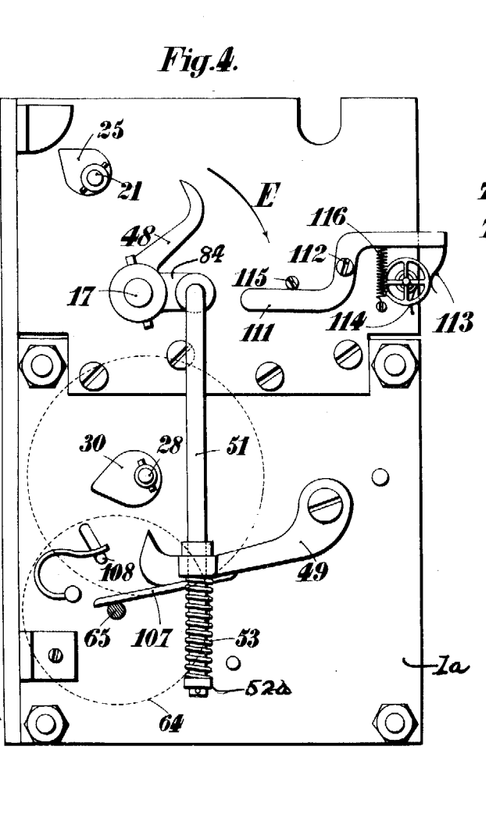
Figs. 4 and 5 are side elevations.

The means whereby the operation of the device is had according to the hour or time tariff is as follows, reference being had particularly to Fig. 4. The shaft 17 is rotated in the direction of the arrow E which lowers the flag or the engaged notice. Carried by the shaft 17 is an arm 48 which towards the end of the movement of the shaft in the direction indicated by the arrow E, contacts with one end of a lever 111 which is pivoted as at 112 to the outer side of the plate 1ª. The engaging of the arm 48 with the end of the lever 111 will shift it upon its pivot. The lever 111 carries a flexible blade 113 which bears lightly on the periphery of the balance wheel 114 of the clock-work. That end of the lever 111 which carries the flexible blade 113 is normally retained in the lowered position through the medium of a spring 116 so that the normal position of the blade 113 will be in engagement with the balance wheel 114. As before stated, the lever 111 is rocked upon its pivot when the arm 48 engages with one end of the lever 111. This action moves the blade 113 from engagement with the balance wheel 114 and allows of the operation of the clock-work. The clock-work is then free to operate and as it gears with the wheel 13, motion will be imparted to the gear wheel 13 and through the medium of the pawl 12 and ratchet wheel 14, the spindle 9 will be revolved, consequently carrying the gear wheel 10 therewith which in turn will rotate the gear wheel 15 and as the latter is meshing with the gear wheel 20, the operation of the indicating and integrating drums will be had. When the arm 48 moves off of the end of the lever 111, the said lever will be free and owing to the action of the spring 116 the lever 111 will be returned to its normal position and the blade 113 engaging with the balance wheel 114 will arrest the operation of the clock-work.

Figure 3:
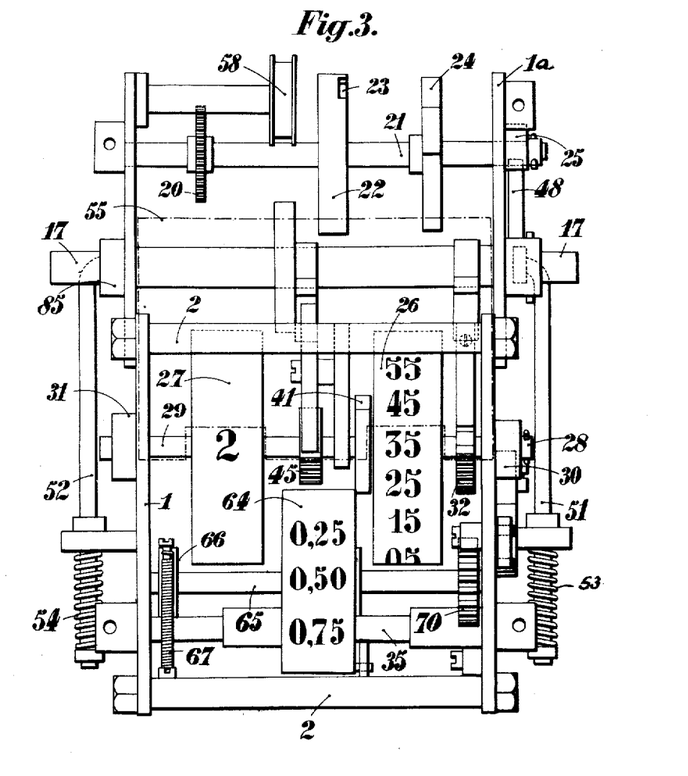
Fig. 3 is a front elevation of the apparatus.

The drums for indicating the amount to be paid by the hirer are indicated by the reference characters 26 and 27, more clearly shown in Fig. 3, the drum 26 indicating the tenth of a franc while the drum 27 indicates francs. These drums are mounted on independent arbors, the drum 26 upon the arbor 28 and the drum 27 upon the arbor 29. The said arbors 28, 29 carry on their outer ends heart-shaped cams 30, 31 respectively, the cam 30 being positioned exteriorly of the plate 1ª and the cam 31 exteriorly of the plate 1. To the arbor 28 is fixed a ratchet wheel 32 which is engaged and operated by a pawl 33 pivotally connected to an oscillatory lever 34 loosely mounted on a transverse bar 35. A spring pressed detent 33' supported upon the plate 1ª engages the ratchet wheel 32 to prevent backward rotation thereof. The pawl 33 during the oscillations of the lever 34 is adapted to engage with the ratchet wheel 32 and impart motion to the arbor 28 which in turn will shift the drum 26 so as to expose an indication representing a fraction of a franc through the opening 62 in the plate 56. Carried by the lever 34 is an adjustable screw 34' which is adapted to engage at the proper moment the teeth of the ratchet wheel 32 so as to prevent it moving more than one tooth at a time when it is operated through the medium of the lever 34 and pawl 33. To the upper end of the lever 34 is attached an arm 36 which carries a roller 37 or other equivalent device working with a smooth friction. The lever 34 furthermore carries at its upper end an arm 38 provided with a latch 39 (see Figs. 2 and 8) which is capable of turning in one direction, but arrested in the other direction by a stop. The function of the latch 39 and roller 37 will be hereinafter referred to. The gear wheel 20 is carried by an arbor 21, which also has mounted thereon a drum 22 and a toothed cam 24 (see Figs. 2, 3 and 9). The drum 22 is formed with a projecting rim which is provided with a notch 23. A spring 40 is connected at one end to the lever 34 and at its other end to the plate 1ª so as to constantly pull the lever 34 towards the arbor 21. The latch 39 carried by the arm 38 is adapted to extend through the notch 23 of the drum 22 inside the projecting rim of the said drum 22, and when in the projecting rim of the drum 22, the said latch cannot leave said drum 22 when the lever 34 is urged to move away from the arbor 21, whereas when the latch 39 is outside the rim it cannot get inside unless it is opposite the notch 23. When the latch comes opposite the notch 23 it is evident that the action of the spring 40 will move the lever 34 so that the latch will enter through the notch to a position inside the rim of the drum 23.

Figure 9:
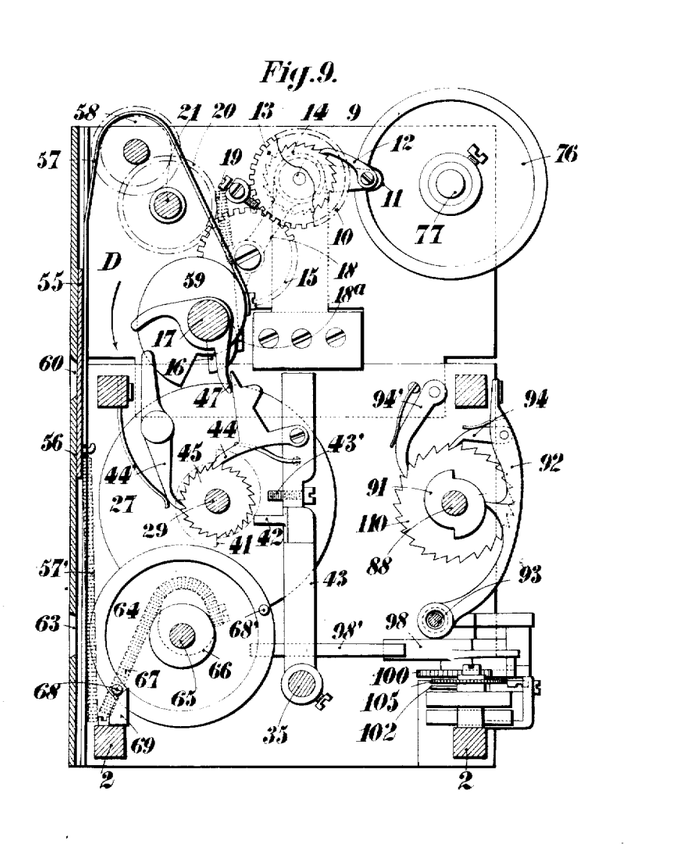

The drum 26 controls the movement of the drum 27 and for such purpose the arbor 28 has keyed thereon a double stepped cam 41 (Fig. 9). A lever 43 is provided which is mounted upon the arbor 35 and which carries a finger 42 bearing on the cam 41. The lever 43 also carries a pawl 44 which gears with the ratchet wheel 45 keyed on the arbor 29 the latter carrying the drum 27. Back rotation of the ratchet wheel 45 is prevented through the medium of the spring pressed detent 44'. The lever 43 furthermore carries an adjustable screw 43' which is adapted at the proper moment to contact with the teeth of the ratchet wheel 45 so as to prevent said wheel from moving more than one tooth when operated by the pawl 44.

The arbor 21 carries a heart-shaped cam 25 serving as a means for returning the drum 22 to its initial position and the heart-shaped cams 30 and 31 also constitute means for returning the drums 26 and 27 to initial position. In the foregoing connection it will be stated that when the flag staff 17 is rotated in the direction indicated by the arrow D, Figs. 8 and 9, which raises the engaged notice or the flag, it releases the pawls 33 and 44, Figs. 8 and 9, through the medium of the respective arms 46 and 47 which are carried by the arbor 17. The said arms 46 and 47 act upon small levers projecting from the pawls 33 and 34 and also on the detents 33' and 44', thus disengaging the ratchet wheels 32 and 45' so that the drums 26 and 27 and their arbors are disconnected from the train of operating elements. At the same time such rotation of the arbor 17 brings the hook-shaped ends of the arms 48, 49 and 50, in contact with the points of the heart-shaped cams 25, 30 and 31. As before stated the arm 48 is carried by the arbor 17, while the arms 49 and 50 are connected with the arbor 17 through the medium of the cranks 84 and 85 carried by said arbor 17 and connected to the links 51, 52 which extend through the arms 49 and 50. The links 51 and 52 carry abutments 52ª at their lower ends, between which and the arms 49, 50 are positioned the springs 53, 54, the springs surrounding the lower ends of the links 51, 52. By the compression of these springs when the arbor 17 is rotated in the direction of the arrow D (Figs. 8 and 9), and the links 51 and 52 elevated thereby, it will be apparent that the hook-shaped ends of the arms 48, 49 and 50 are caused to exert the required pressure on the heart-shaped cams so that the said cams rotate until the ends of the arms 48, 49 and 50 rest on the point nearest to the center of rotation of the cams of the arbors 21, 28 and 29. These latter can then rotate as all the detents and pawls are disengaged. The position which the arbors 21, 28 and 29 then assume is that which corresponds to the initial position of the drums 22, 26 and 27. The disengagement of the pawl 33 through the medium of the arm 46 will cause the arm 34 to move the latch 39 outside of the rim of the drum 22. The disengagement of the pawl 33 through the medium of the arm 46 will cause the arm 34 to move the latch 39 outside the rim of the drum 22. If at this moment the driver takes a fare, he lowers the "engaged" notice, thereby rotating the shaft 17 and causing the pawls 33 and 44 and detents 33' and 44' to engage the ratchet wheels 32 and 45, while the wheel 15 is again thrown into gear with the wheels 20. The motion of the vehicle is then transmitted to the arbor 21. If the vehicle is run according to the distance tariff, the rotation of the ratchet wheel 8 will, as already explained, cause the rotation of the shaft 21. If the vehicle is run according to time tariff, the clock work in gear with the shaft 9 will then operate the arbor 21. The drum 22 begins to rotate, the latch 39 slides on the projecting rim of the drum 22 until the notch 23 comes under the end of the latch, when the latter passes through the notch under the action of the spring 40. This movement of the lever 34 causes the pawl 33 to act on the ratchet wheel 32 and the drum 26 to move one division. This first forward movement corresponds, according to the above named Parisian tariff, to the first twelve hundred meters covered by the vehicle, or to nine minutes of time elapsed since the hiring of the vehicle. This rate might be altered to correspond to any other desired distance or time, by altering the initial position of the notch 23 relatively to the latch 39 and also, if needed, the rotation of the shaft 21. The latch having now entered the inside of the rim of the drum 22 has no further action thereon and the roller 37 travels on the cam 24. On passing over the teeth of the cam 24, the roller imparts to the lever 34 an oscillating motion which causes the ratchet wheel 32 to move one tooth at each oscillation, while the drum 26 moves one division.

When the drum 26 has registered the sum of one franc (that is, ten tenths of a franc), this amount must be transferred to the drum indicating francs, which operation is effected by the finger 42 and the cam 41. When the finger passes over one tooth of the cam, the ratchet-wheel 45 moves one tooth and turns the drum 27 one division.

Figure 1:
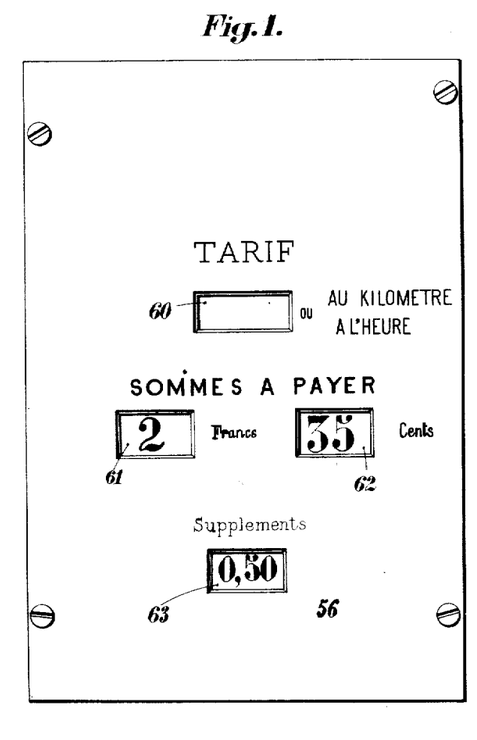
—Figure 1 is a front elevation of an apparatus in accordance with this invention, showing the openings through which the indications are displayed.

The operation of the "engaged" notice also causes the raising, or lowering of the indicator plate 55 in guides on a plate 56. The plate 55 is suspended on a flexible band 57 passing over a grooved pulley 58 and winding itself on a cam 59 on the arbor 17. The said plate 55 has marked on it suitable indications to notify the public as to whether the vehicle is engaged or disengaged or to convey any other information which may be deemed necessary, such indications being read through an opening 60 provided in the front plate 56 as shown in Fig. 1, and being changed automatically by the raising and lowering of the plate through the means in the manner described. This plate can, when lowered, close the openings 61 and 62 through which the respective drums 27 and 26 are normally exposed to view.

The drum 64 (Figs. 8 and 9) exposes to the hirer the amount of the supplementary charges which he has to pay and the said drum 64 is keyed on an arbor 65 (Figs. 3, 8 and 9) which is supported by the plates 1, 1ª. To the arbor 65 is also fixed a cam 66 (Fig. 9) over which winds a spring 67 the function of which is to return the drum 64 to its initial position when the working parts are returned to the zero position. This position is determined by a stud 68 adapted to contact with the projection 69 fixed to the frame of the apparatus. The shaft 65 carries a ratchet wheel 70 (Fig. 8), the said ratchet wheel being actuated through the medium of a spring pressed pawl 71 pivoted on a rod or lever 72. The rod or lever 72 is capable of a retractile motion and is formed with elongated slots 73 through which pass the screws 74, these screws being connected to the plate 1ª. A retracting spring 75 normally acts to pull the rod or lever 72 rearwardly. The rod or lever 72 is operated through the medium of a handle which projects on the outside of the apparatus and it will suffice to operate the lever or rod to cause the drum 64 to indicate the amount of extra charges to be paid, the indication being visible through the opening 63 in the front plate of the machine. The drum 64 is returned to the zero position when the vehicle is again hired, the operation being as follows: When the engaged notice or flag is elevated the finger 107 (Fig. 4) which is integral with the hooked arm 49 elevates a pin 108 which disengages the detent 109 (Fig. 8), the detent preventing backward rotation of the wheel 70. When the detent 109 is elevated out of engagement with the ratchet wheel 70, the action of the spring 67 rotates the drum 64 until the stud 68 comes into contact with the projection 69 (Fig. 9) consequently arresting the further movement of the drum, the drum at this point being in its initial position. A stud 68' which is adapted to engage with the back of the projection 69 limits the rotation of the drum 64 in the opposite direction.

Figure 6:
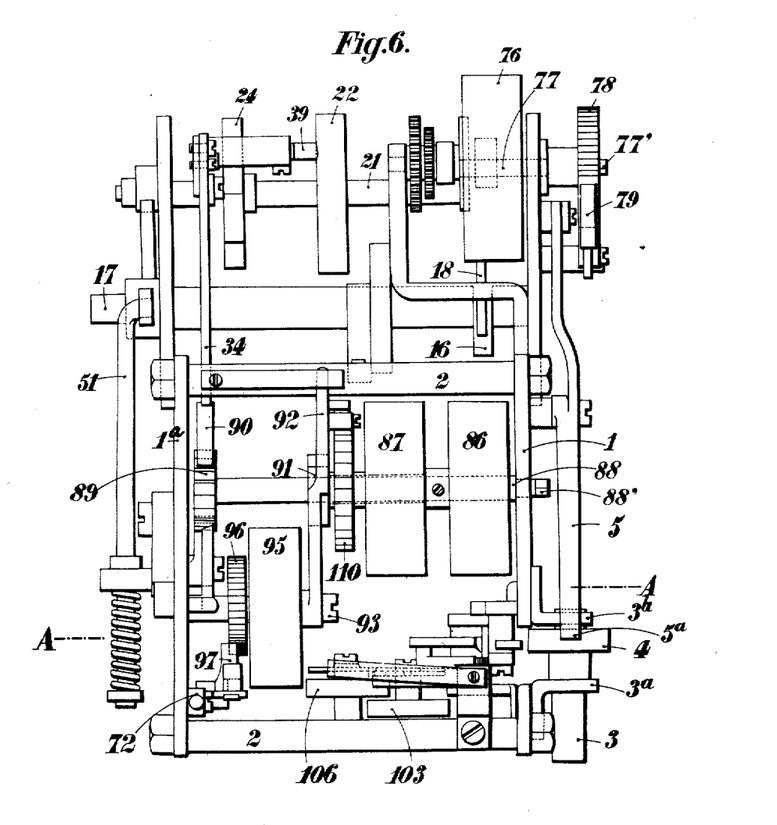
Fig. 6 is a rear elevation.
Figure 8:
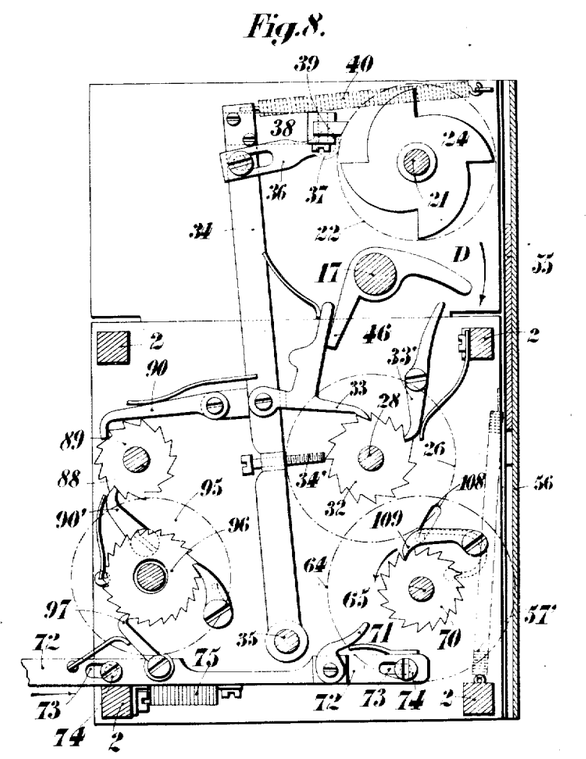

The mechanisms hereinbefore referred to are adapted to indicate to the hirer of the vehicle the amounts to be paid by him. A description will now be set forth of the mechanisms whereby the owner of the vehicle is enabled to check the number of times the vehicle is hired and the fares received by the driver for the hiring of the vehicle, whether such fares be what may be termed regular or extra. Said mechanisms comprise a drum 76 (Figs. 2, 5 and 6) which records the total number of times the vehicle has been engaged. The drum 76 is fixed to an arbor 77 which carries a ratchet wheel 78 operated by a pawl 79. The latter is pivoted to a lever 80 which oscillates upon an axis 81. A spring 82 engages with one end of the lever 80, whereby the said end is normally maintained against a stud 81'. The pawl 79 is retained in engagement with the ratchet wheel 78 by a spring 79'. Spring-pressed detents 83, 84 engage the ratchet wheel 78 to maintain it in position. When the working parts of the device are returned to zero, the crank 85 which is secured to the arbor 17 raises the lever 80 to such an extent that the pawls 79 ride over one tooth of the ratchet wheel 78 and when the lever 80 is released, the spring 82 acting on the end of said lever shifts the same, and causes through the medium of the pawl 79 the moving of the ratchet wheel 78 one tooth, thereby registering the hire of the vehicle. In order to prevent the ratchet wheel 78 from revolving around and passing again through its zero position, one tooth has been omitted, so that when the pawl 79 reaches the gap thus formed, it can no longer operate the ratchet wheel and consequently no further hire of the vehicle is registered. The omission of one tooth from the ratchet teeth 78 renders the provision of the compound detents 83, 84 necessary. The drum 76 can be returned to zero position by means of a key slipped on the square end 77' of the arbor 77, whereby the latter can be rotated. The said mechanisms further comprise drums 86 and 87 (Fig. 6) which serve to integrate the amounts received for fractions of distance run, or of time elapsing beyond the distance or time elapsed for which the vehicle is hired. These increments of extra distances may be 400 meters each, or the time increments may be three minutes each. The drum 86 illustrates the centimes and is secured to a shaft 88, Figs. 6 and 8. On the shaft 88 is mounted a ratchet wheel 89 which is operated through the medium of the pawl 90, the latter being pivoted on the lever 34, Fig. 8. A spring pressed detent 90' engages with the ratchet wheel 89 to prevent backward rotation thereof. Each oscillation of the lever 34 causes the ratchet 89 to move one tooth. It will be stated that the returning of the drums 26 and 27 to zero position does not affect the ratchet wheel 89 and consequently the drum 86 will integrate all the tenths of a franc indicated by the drum 26 after each hire. The amounts indicated by the drum 86 must be converted into francs and this provision is effected through the medium of the drum 87, the latter being mounted on a sleeve carrying a ratchet wheel 110 (Figs. 6 and 9), the sleeve being loosely mounted on the spindle 88. The spindle 88 furthermore carries a double stepped cam 91 (Fig. 9), which operates the lever 92, the latter being pivoted as at 93 and carrying a spring pressed detent 94. This pawl engages the ratchet wheel 110, the latter being prevented from backward rotation by a detent 94'. If the drum 86 accomplishes, however, a rotation it is moved ten divisions corresponding to 100 centimes and which causes the drum 87 to move one division so as to register the franc corresponding to the 100 centimes. The integrating drums 86, 87 can be returned to zero position by rotating the spindle 88 in the necessary direction. Such rotation is effected exteriorly of the mechanism through the medium of a key slipped on the squared end 88' of the spindle 88 (Figs. 5 and 6). The said mechanisms further embody a means for integrating the extra charges. Said means consists of a drum 95 (Fig. 8). With this drum is formed integrally a ratchet wheel 96 deriving its movement from a pawl 97 carried by the rod or lever 72.

Figure 7:
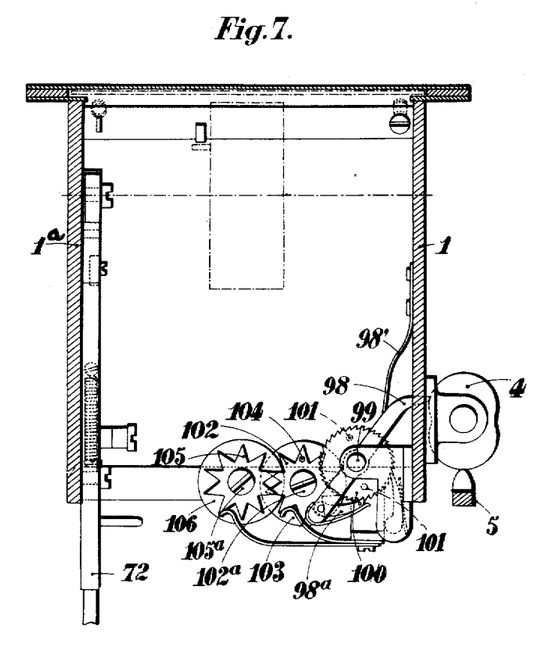
Fig. 7 is a section on line A—A.

An apparatus in accordance with this invention not only comprises the various indicating and integrating mechanisms heretofore set forth, but also a mechanism for totalizing the distance traversed by the vehicle. Such mechanism consists of a spring 98' (Fig. 7) bearing against the lever 98 and causing said lever to turn on a spindle 99. The shifting of the lever 98 on the spindle 99 will cause said lever to press on the cam 4, the latter as before stated being carried by the vertically extending and rotatable spindle 3. The lever 98 is provided at one end with a pawl 98ª engaging with a ratchet wheel 100. Each time the end of the lever 98 passes over the projecting part of the cam 4, the wheel 100 is moved one tooth by the pawl 98ª. The ratchet wheel 100 is provided with two projections 101 which are adapted to come into contact with the teeth of a star wheel 102, the said wheel 102 being provided with ten teeth and is mounted on a spindle 102ª which carries a drum 103. At each complete revolution of the star wheel 102 a projection on the said wheel 102 comes into contact with a star wheel 105, the latter being caused to rotate a distance of one tooth through the medium of the projection 104, such movement being indicated by the drum 106, as the latter is mounted on the spindle 105ᵃ which carries the star wheel 105. By the foregoing arrangement, the total number of kilometers or miles traversed in a day by the vehicle is indicated on the two drums 103, 106, the figures on the drum 103 indicating the units and the figures on the drum 106 indicating the tens. These integrating devices are always operated whether the registering device is in gear or not.

The aforesaid mechanisms do not permit of the apparatus being tampered with as all the operations effected by the driver are checked by the owner of the vehicle who alone can return the apparatus to zero position.

In order to have the invention thoroughly understood, we have set up the same as adapted in connection with the regulations in force in Paris, but it is evident that the various mechanisms can be adjusted and constructed for any other fraction of time, distance and fares to be received or integrated.

We claim—

1. In an apparatus of the class described, the combination with registering and integrating drums, of actuating means for said drums, said means comprising an intermediate shaft, a pawl and ratchet mechanism for operating said shaft, a spindle, a stepped cam upon said spindle, means for transmitting motion from said intermediate shaft to said spindle, an oscillatory lever operated by said cam, means for rotating the registering and integrating drums, said means actuated by the lever and engaging with said drums, and means carried by the lever for operating said rotating means.

2. In an apparatus of the class described, the combination with registering and integrating drums, of actuating means for said drums, said means comprising a spindle carrying a notched drum and a stepped cam, means for rotating the spindle, a roller carried by said lever and adapted to be actuated by the cam, thereby oscillating the lever, an arm carried by the lever and provided with a latch adapted to engage in the notched drum to position said roller in the path of the cam, and a rotating means for the drums carried by the lever.

3. A registering apparatus for vehicles comprising the combination with indicating and integrating drums, of an actuating means common to both drums and embodying a rotatable shaft carrying a pair of ratchet wheels, an oscillatory lever provided with a pawl engaging with one of said ratchet wheels for rotating the shaft when the vehicle is traveling at or above a predetermined speed limit, means engaging with the other ratchet wheel for rotating the shaft when the vehicle is standing still or traveling below a predetermined speed limit, a spindle rotatable by a moving part of the vehicle, and a cam carried by the spindle and adapted to engage and oscillate said lever.

4. A registering apparatus for vehicles comprising the combination with indicating and integrating drums, of an actuating means common to both drums and embodying a rotatable shaft carrying a pair of ratchet wheels, an oscillatory lever provided with a pawl engaging with one of said ratchet wheels for rotating the shaft when the vehicle is traveling at or above a predetermined speed limit, means engaging with the other ratchet wheel for rotating the shaft when the vehicle is standing still or traveling below a predetermined speed limit, a spindle rotatable by a moving part of the vehicle, a cam carried by the spindle and adapted to engage and oscillate said lever, a totalizing means for the distance traversed by the vehicle, and a lever and ratchet mechanism actuated by said cam for operating said totalizing means during the travel of the vehicle.

5. A registering apparatus for traveling vehicles comprising indicating drums for exposing the normal rate of fare to be paid by the hirer, integrating drums for registering the total amount of fares exposed by the indicating drums, an actuating means common to said drums, means normally in engagement with said actuating means for operating it and embodying a rotatable shaft, and a rotatable gear driven from the shaft and normally in engagement with said actuating means and a pair of ratchet wheels upon the shaft, an oscillatory lever carrying a pawl engaging with one of said ratchet wheels for rotating the shaft when the wheel is traveling at or above the predetermined speed limit, means engaging with the other ratchet wheel for rotating the shaft when the vehicle is standing still or traveling below a predetermined speed limit, a rotatable spindle operated from a moving part of the vehicle, a cam carried by the shaft and adapted to engage and oscillate said lever, and means for moving said gear out of engagement with said actuating means whereby the actuation of said drums is discontinued.

6. A registering apparatus for traveling vehicles comprising indicating drums for exposing the normal rate of fare to be paid by the hirer, integrating drums for registering the total amount of fares exposed by the indicating drums, means normally in engagement with said actuating means for operating it and embodying a rotatable shaft, and a rotatable gear driven from the shaft and normally in engagement with said actuating means and a pair of ratchet wheels upon the shaft, an oscillatory lever carrying a pawl engaging with one of said ratchet wheels for rotating the shaft when the wheel is traveling at or above the predetermined speed limit, means engaging with the other ratchet wheel for rotating the shaft when the vehicle is standing still or traveling below a predetermined speed limit, a rotatable spindle operated from a moving part of the vehicle, a cam carried by the shaft and adapted to engage and oscillate said lever, means for moving said gear out of engagement with said actuating means whereby the actuation of said drums is discontinued, and totalizing means for the distance traversed by the vehicle and a lever and ratchet mechanism actuated by said cam for operating said totalizing means.

7. A registering apparatus for vehicles comprising an indicating means for exposing the normal rate of fare to be paid by the hirer, an integrating means for exposing the total amount of fares exposed by the indicating means, an actuating means common to both indicating and integrating means and embodying a rotatable shaft carrying a pair of ratchet wheels, an oscillatory lever carrying a pawl engaging with one of said ratchet wheels for rotating the shaft when the vehicle is traveling at or above a predetermined speed limit, means engaging with the other ratchet wheel for rotating the shaft when the vehicle is standing still or traveling below a predetermined speed limit, a rotatable spindle operated from a moving part of the vehicle, and a cam carried by the shaft and adapted to engage and oscillate said lever.

8. A registering apparatus for vehicles comprising the combination with indicating and integrating drums, of actuating means for said drums, said means comprising a spindle carrying a notched drum and a stepped cam, means for rotating the spindle, a roller carried by said lever and adapted to be actuated by the cam thereby oscillating the lever, an arm carried by the lever and provided with a latch adapted to engage in the notched drum to position said roller in the path of the cam, a rotating means for the drum carried by the lever, combined with operating means for said actuating means, an oscillatory lever for operating the operating means for said actuating means, a rotatable means operated from a moving part of the vehicle, and a cam carried by said rotatable means and engaging said last-mentioned oscillatory lever for operating it.

9. A registering apparatus for traveling vehicles comprising an indicating drum for exposing the normal rate of fare to be paid by the hirer, an integrating drum for recording the total amount of fares exposed by the indicating drum, a common operating means for said indicating and integrating drums, means for registering the total number of times the vehicle has been hired, means for returning said indicating and integrating drums to zero position, means for indicating when the vehicle is occupied or unoccupied, means for operating said indicating means, and a normally locked actuating means for the means for totalizing the number of times the vehicle has been hired, said normally locked actuating means adapted to be released when said indicating means is shifted to indicate that the vehicle is unoccupied, whereby said means for totalizing the number of times the vehicle has been hired will be operated.

In testimony whereof we have hereunto set our hands in presence of two subscribing witnesses.

RICHARD GEORGES POPP.
ALDO LEVIS DE HOREVITZ.

Witnesses:
 EUCILE KLOBE,
 HERNANDO DE SOTO.